United States Patent [19]

Gustavsson et al.

[11] 4,196,380
[45] Apr. 1, 1980

[54] DEVICE FOR SERVO SYSTEM WITH CLOSED SERVO CIRCUIT

[75] Inventors: Varne Gustavsson; Manne Salomonsson, both of Karlskoga, Sweden

[73] Assignee: Aktiebolaget Bofors, Bofors, Sweden

[21] Appl. No.: 858,994

[22] Filed: Dec. 9, 1977

[30] Foreign Application Priority Data

Dec. 9, 1976 [SE] Sweden .............................. 7613820

[51] Int. Cl.² .......................................... G05B 11/01
[52] U.S. Cl. ................................ 318/630; 89/41 LE; 318/648
[58] Field of Search ...................... 89/41 ME, 41 LE; 318/615, 616, 617, 630, 648

[56] References Cited

U.S. PATENT DOCUMENTS

2,582,221  1/1952  Belsey et al. ..................... 318/630
2,615,150 10/1952  Liversidge ........................ 318/616

*Primary Examiner*—Stephen C. Bentley
*Attorney, Agent, or Firm*—Pollock, Vande Sande & Priddy

[57] ABSTRACT

A servo-motor control system having a load that is supported by a gear ring. The gear ring and the associated load are rotated by a driving wheel that is connected to the shaft of a servo motor. At least one transmitter rotatably contacts the gear ring at a point substantially 90° from the point of contact of the driving wheel. As the gear ring rotates, the transmitter generates a control signal that corresponds to the angle of rotation of the gear ring and includes a backlash signal component corresponding to either the magnitude or speed of the backlash and/or resilience of the servo system. A measuring means rotatably contacts the shaft of the servo motor and generates a servo operating signal corresponding to the operational angle of rotation of the servo motor. The control signal and the servo operating signal are combined by an adder to generate a difference output signal having a component corresponding to the negative backlash signal component. A position sensing gyro generates a signal corresponding to the movement of the load and the gyro signal includes a component corresponding to the backlash signal component. The gyro signal and the difference output signal are added to generate a feedback output signal from which the backlash signal component has been eliminated. The feedback signal is applied to control the operation of the servo motor.

4 Claims, 6 Drawing Figures

DEVICE FOR SERVO SYSTEM WITH CLOSED SERVO CIRCUIT

The present invention relates to a device for a servo system with a closed servo circuit. As an example of uses, reference can be made to a servo system for aiming a firearm, which then comprises a gear ring to which the firearm, in principle, is rigidly fastened, and which can be rotated by the servo motor in the servo system.

Figure 1:
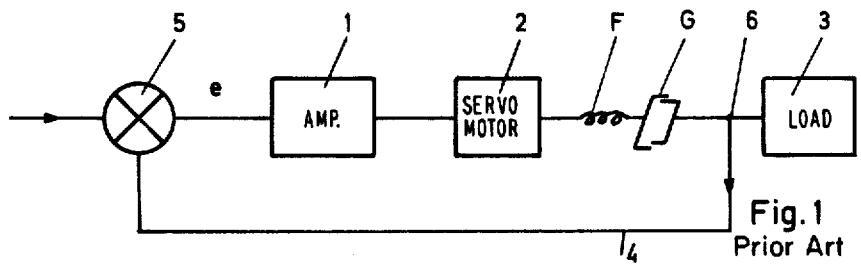

An example of a closed servo circuit, which is previously known in itself, is shown in the accompanying FIG. 1, in which the numeral 1 indicates an amplifier, 2 a servo motor and 3 a load, for instance in the form of said firearm, and 4 a feedback loop. The nominal value is inserted at point 5 and the actual value is at point 6. In such a circuit, resilience F and//or backlash G often give rise to undesired effects, such as instability and stepped movements at low speeds. A high dynamic accuracy requires a high gain in the system, but the phase shifting and amplitude changes caused by resilience and backlash limit the gain and, accordingly, also the dynamic accuracy.

In many servo systems, as indicated in FIG. 1, the greatest amount of resilience and backlash is to be found in the transmission between the servo motor 2 and the load 3. If the system is modified in a known way in accordance with the following FIG. 2 so that the feedback takes place directly from the output end of the servo motor 2, the resilience F and backlash G shown in the figure will not be directly comprised in the closed servo circuit, but the feedback takes place from the point 7, which corresponds to the output shaft of the servo motor. The major portion of the undesired effects indicated is thereby eliminated, but instead, an unaccuracy in the position of the load 3, caused by the resilience F and the backlash G, is obtained, In the circuit according to FIG. 2, a gear transmission for the servo motor is also indicated with the numeral 8.

Figure 2:
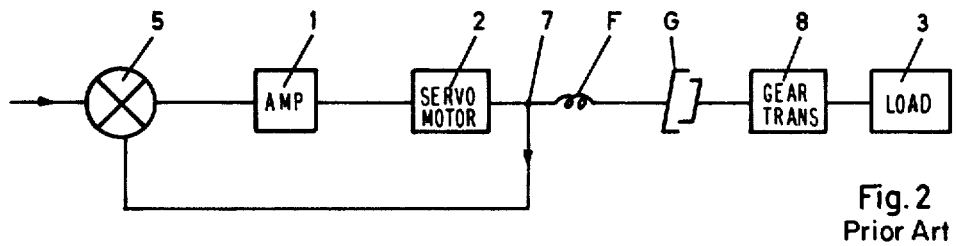

In certain servo systems it is moreover impossible to achieve a feedback according to FIG. 2. This is the case e.g. when in accordance with FIG. 3 a gyro 9 is placed on the load as a position or speed-sensing feedback device. If there are also disturbances $\beta$, e.g. from a moving base (e.g. a rolling boat) which influence the servo system, this can be shown simplified according to FIG. 3, in which the turning angle for the servo motor 2 has been indicated with $\rho$ and the turning angle for the gear transmission 8 (the load 3) with $\alpha$. The disturbances $\beta$ are introduced in the circuit at point 10, after which the signal $\alpha + \beta$ is thus obtained.

Figure 3:
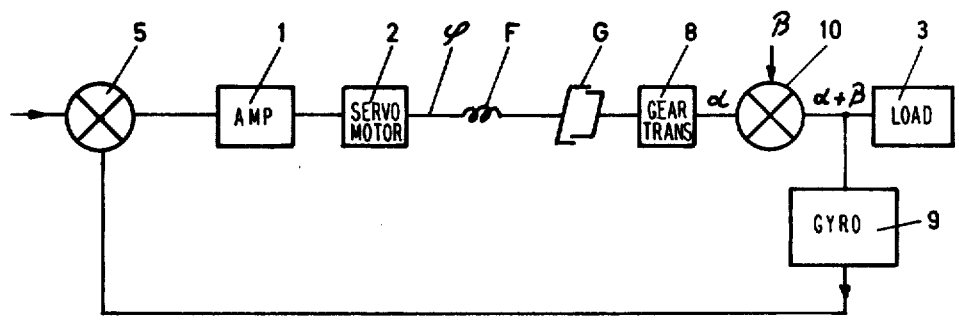

In order to obtain good servo-technical properties in a system according to FIG. 3, measures must be taken to obtain a transmission which is rigid and free from backlash, to the greatest possible extent. Pre-stressed supporting members, over-dimensioned transmission elements, gear wheels set hard against each other, coupling elements with spring action and other expensive, bulky and heavy solutions have been used, with a certain improving effect. In many cases, however, it is not possible in practice to achieve as great improvements as would be desired by taking such measures.

The present invention is directed towards these problems, and proposes a simple and efficient device which in a system, e.g. of the type shown in FIG. 3, eliminates the major portion of the above-mentioned drawbacks caused by resilience and backlash in the transmission between the servo motor and the load.

The feature that can mainly be considered to be characteristic for a device according to the invention is that measuring devices connected to sensing points before and after undesired backlash and/or resilience measure a parameter in the closed servo circuit such as size, speed, etc. of said backlash and/or resilience, and that the measuring devices, possibly together with signal-processing devices, are also arranged to permit values measured by the measuring devices, after possible signal processing, to be fed into a point in the servo circuit which is separate from said sensing points so that the effects caused by said backlash and/or resilience will be eliminated from the signal fed back into the circuit.

In a further development of the concept of the invention, further indications are also proposed for the applications of the measuring devices in relation to the driving wheel for the load driven by the servo motor.

Figure 4:
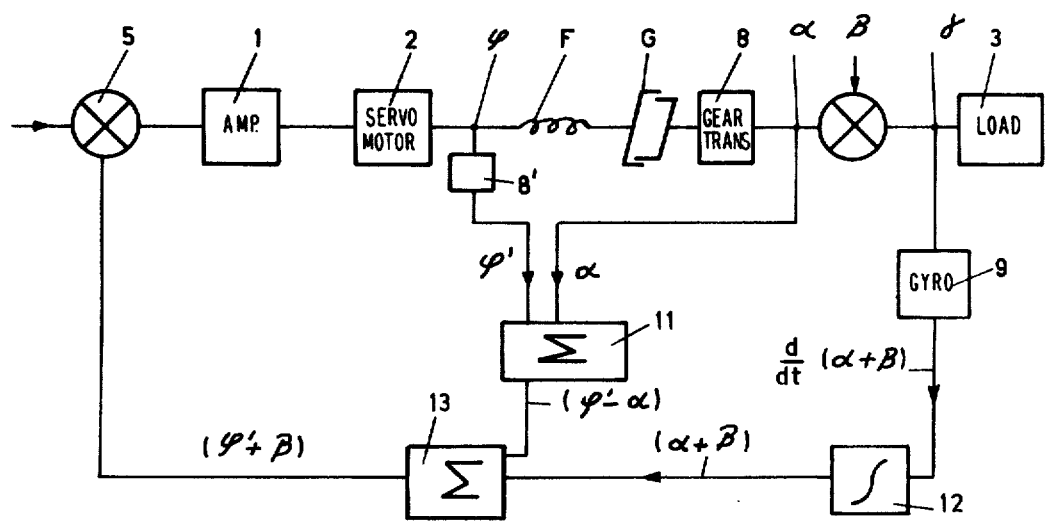
Figure 5:
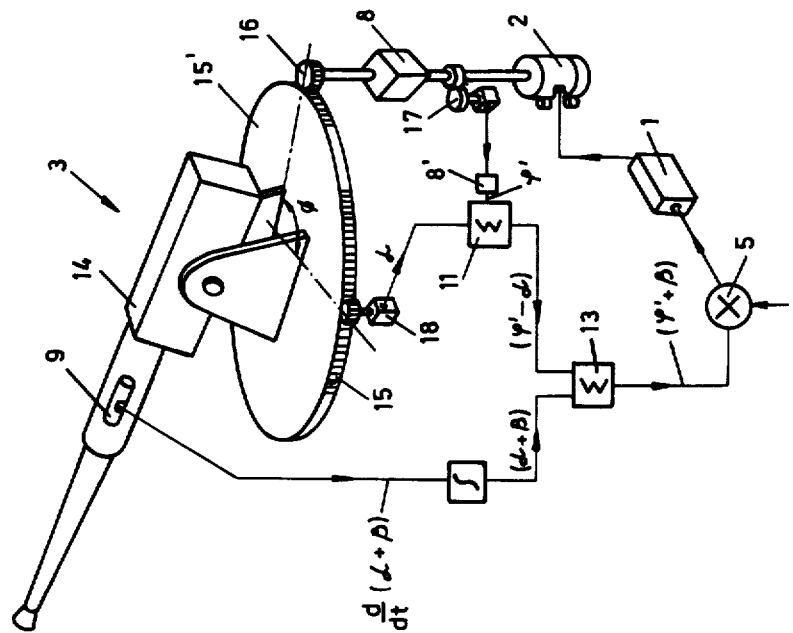
Figure 6:
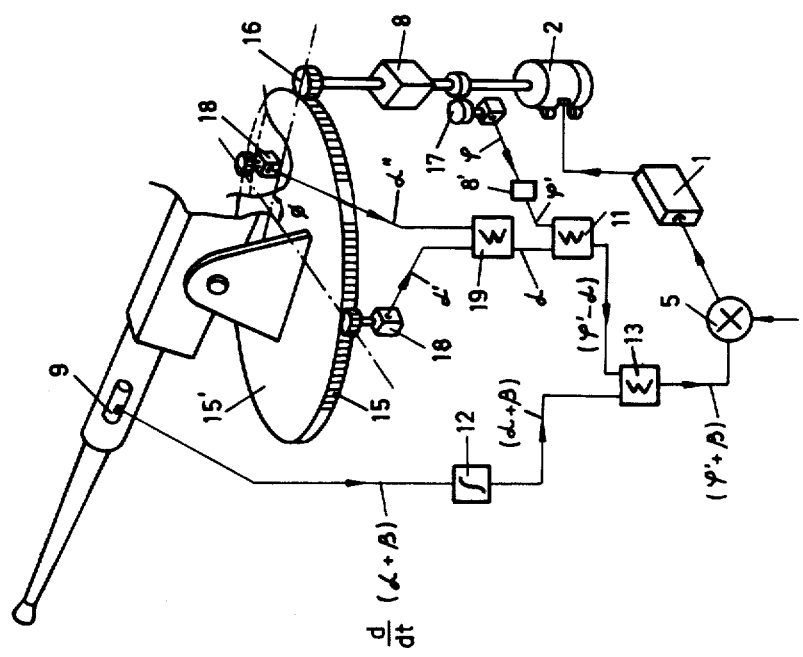

An embodiment proposed at present of a device which has the characteristics significant for the invention will be described in the following, with reference to the accompanying drawings, in which FIGS. 1–3 show schematically and in accordance with the above previously known servo systems, FIG. 4 shows schematicaly a servo system utilizing the new device, FIGS. 5–6 show in a combined schematic form and design form, a first and a second embodiment of the system according to FIG. 4.

In the figures, parts corresponding to each other have been given the same reference designations.

The servo circuits according to FIGS. 1-3 have been described in connection with the problems as above, and the servo circuit according to FIG. 4 differs from the servo circuit according to FIG. 3 inter alia in that the magnitudes $\rho$ and $\alpha$, i.e. the positions of the output shaft of the servo motor and of the load 3, respectively, related to the same co-ordinate system, are measured continuously with measuring devices after the magnitude $\rho$ in a conversion part 8' has been referred to the same nominal speed level as the magnitude $\alpha$, which in FIG. 4 has been indicated with the magnitude $\rho'$. In FIG. 4, said measuring devices are represented by a first adder 11, which gives the magnitude $(\rho' - \alpha)$ which corresponds to the momentary magnitude of the undesired backlashes G and resiliences F.

The speed-sensing gyro 9 gives information about the speed of the load 3 in a space-fixed co-ordinate system, which information is obtained in the form of an output signal proportional to $(d/dt)(\alpha + \beta)$ in which $\beta$ is the momentary value of the disturbance.

Through integration in an integrator 12 of the gyro signal, approximately the signal $(\alpha + \beta)$ is obtained, and it may then be pointed out that an ideal integration is not practically possible. A summation in a second adder 13 of the integrated gyro signal $(\alpha + \beta)$ and the measured values $(\rho' - \alpha)$ of the backlash G and the resilience F gives as a result a signal $(\rho' + \beta)$. As will be noted, this signal does not receive any information about the backlash G and the resilience F of the transmission. Thus, as regards the influence of backlash and resilience, the system will have substantially the same properties as a system according to FIG. 2.

In the embodiment according to FIG. 5, the load 3 consists of a firearm 14, which is rotatable in traverse by means of a gear ring 15, of a kind which is known in itself. The gear ring can be driven by means of a driving wheel 16 on the output shaft of the gear transmission device. The measuring devices for measuring values of ρ and α are achieved by means of two angle transmitters 17 and 18, of which the transmitter 17 is in mesh with a gear wheel on the shaft of the servo motor and the transmitter 18 is in mesh with the gear ring 15. The gear wheel on the transmitter 18 is then of a kind which is known in itself which is divided and is spring-loaded, and will thereby be in spring-action contact with the gear ring 15. The platform 15' supporting the gear ring, on which the firearm is mounted, in the practical case is most often not supported entirely without backlash, whereby the last part of the transmission in the servo circuit will consist of the gear transmission 15 and 16 together with the platform, which has a certain amount of backklash.

The positioning of the angle transmitter 18 in relation to the driving wheel 16, related in the plane of the platform, is essential in order that only the strictly rotating movement, and no translation movements, shall be indicated by the angle transmitter 18. Said translation movements foreseen in this case are primarily those which are at right angles to the diameter of the platform and which intersect the driving wheel 16, and which arise inter alia because of said backlash in the suspension of the platform. In order to achieve the best possible reproduction of the angle α with the angle transmitter 18, it has proved that the latter should be placed at an angle φ in relation to the driving wheel 16 which is approx. 90°.

In order to achieve still more efficient elimination of the translation movements when the platform is turned by means of the driving wheel 16, in accordance with FIG. 6, the angle transmitter 18 is replaced by two angle transmitters 18' and 18" which are placed diametrically (=180°) opposite each other, the angle φ between the driving wheel 16 and the respective angle transmitter in the example of the embodiment then being approx. 90°. A third adder 19 is then utilized so that from the signals α' and α" the signal α is given, where the influences of the translation movements in the plate have been eliminated.

The components to which reference has not been made in detail above consist of units which are known in themselves in this connection. For example, the above-mentioned signal processing devices include known synchro elements that are described in Truxal, *Control Engineer's Handbook*, pgs. 651-65 (1958), and Muirhead, *Synchro Engineering Handbook*, pgs. ix-xii (1965).

The invention is not limited to the embodiment shown above as an example, but can be subject to modifications within the scope of the accompanying claims. The solution is, of course, not bound to the signal processing shown. Thus, for instance, instead of measuring the magnitudes α and ρ their time derivatives can be measured, and these can be compared direct with the output signal of the gyro shown. For the rest, all known servo-technical possibilities of signal processing and detailed solutions are open for application in the present case. As a further example may be mentioned that said measuring with measuring devices need not take place continuously, but can be carried out at regular time intervals, which is the case when utilizing sampling measuring transducers, e.g. of the type code discs, and digitalized signal processing.

We claim:

1. An apparatus for a servo system having a closed feedback circuit for controlling a driving servo motor, comprising:
    driving wheel means connected to said servo motor and rotatably contacting a gear ring means to rotate said gear ring means;
    load means supported by said gear ring means for rotation with said gear ring means;
    servo measuring means rotatably contacting said servo motor for measuring a servo operating signal;
    transmitter means for rotatably contacting said gear ring means at a point substantially 90° from the point of contact of said driving wheel means and generating a corresponding first gear signal;
    control means responsive to at least said first gear signal to pass a corresponding control signal having a backlash signal component corresponding to the magnitude of a parameter defining the backlash and resilience of said servo system;
    means for receiving said control signal and said servo operating signal and generating a difference output signal having a component corresponding to a negative of said backlash signal component;
    position sensing gyro means for generating a gyro signal in response to the movement of said load means, said gyro signal including a component corresponding to said backlash signal component;
    means for adding said gyro signal and said difference output signal to generate a corresponding feedback output signal, the addition eliminating said backlash signal component from said feedback signal; and
    means for applying said feedback signal to control said servo motor.

2. The apparatus of claim 1 including:
    an additional transmitter means for rotatably contacting said gear ring means at a point substantially 180° from the point of contact of said transmitter means and generating a corresponding second gear signal, said second gear signal being applied with said first gear signal to said control means to cause said corresponding control signal to be passed.

3. The apparatus of claim 2 wherein said additional transmitter means includes a divided gear wheel that is spring loaded to maintain contact with said gear ring means.

4. The apparatus of claim 1 wherein said transmitter means includes a divided gear wheel that is spring loaded to maintain contact with said gear ring means.

* * * * *